United States Patent
Perkins et al.

(10) Patent No.: US 10,007,563 B2
(45) Date of Patent: Jun. 26, 2018

(54) EVENT CHAIN DETECTION

(71) Applicant: CA, Inc., New York, NY (US)

(72) Inventors: James Andrew Perkins, Fort Collins, CO (US); Richard Bennett Whitner, Fort Collins, CO (US)

(73) Assignee: CA, Inc., New York, NY (US)

( * ) Notice: Subject to any disclaimer, the term of this patent is extended or adjusted under 35 U.S.C. 154(b) by 267 days.

(21) Appl. No.: 14/981,496

(22) Filed: Dec. 28, 2015

(65) Prior Publication Data
US 2017/0185459 A1 Jun. 29, 2017

(51) Int. Cl.
*G06F 9/46* (2006.01)
*G06F 9/54* (2006.01)
*G06F 17/30* (2006.01)
*G06F 11/30* (2006.01)

(52) U.S. Cl.
CPC .......... *G06F 9/542* (2013.01); *G06F 11/3024* (2013.01); *G06F 17/30312* (2013.01)

(58) Field of Classification Search
CPC ....................................................... G06F 9/542
USPC ........................................................ 719/318
See application file for complete search history.

(56) References Cited

U.S. PATENT DOCUMENTS

| 7,523,463 B2 * | 4/2009 | Sluiman | G06F 11/3447 709/224 |
| 2013/0185191 A1 * | 7/2013 | Ganor | G06Q 30/06 705/39 |

OTHER PUBLICATIONS

Allen, "Creating a Repeat Event Detection Rule", http://wmug.co.uk/wmug/b/aguilaweb/archive/2011/03/10/creating-a-repeat-event-detection-rule (as visited Jun. 11, 2015), Mar. 10, 2011, 12 pages.

* cited by examiner

*Primary Examiner* — Andy Ho
(74) *Attorney, Agent, or Firm* — Gilliam IP PLLC

(57) ABSTRACT

A first event indication is received. In response to receiving the first event indication, it is determined that the first event indication has not been tagged. In response to determining that the first event indication has not been tagged, the first event indication is tagged as comprising an event chain. It is also determined that an event count associated with the event chain does not exceed a threshold. In response to determining that the event count does not exceed the threshold, the first event indication is processed.

20 Claims, 9 Drawing Sheets

EVENT CHAIN DETECTION

BACKGROUND

The disclosure generally relates to the field of computing systems, and more particularly to event chain detection.

Event indications are generated by computing systems and related components when an event is detected. The particular circumstances that give rise to an event can vary. For example, a software agent monitoring the operation of a computing system may determine that processor utilization has reached a threshold, which is detected as an event and results in an event indication being generated. As another example, a computing system may periodically generate event indications (i.e., the passage of a certain amount of time is detected as an event). Once generated, the event indications may be sent to an event management system An event management system receives event indications from various components. When the event management system receives an event indication, the event management system identifies one or more rules to use in processing the event indication. Various data can be used to identify the rules to use for a particular event indication. For example, an event indication may include an event type. The event management system can identify any rules that are associated with the same event type.

Once the rules are identified, the event management system processes the event indications in accordance with the rules. The particular operations performed to process the event indications vary according to the rules. For example, a rule may specify that the event indication is forwarded to another component or that a new event indication be created and sent back to the event management system or another component.

BRIEF DESCRIPTION OF THE DRAWINGS

Aspects of the disclosure may be better understood by referencing the accompanying drawings.

DESCRIPTION

Figure 1:
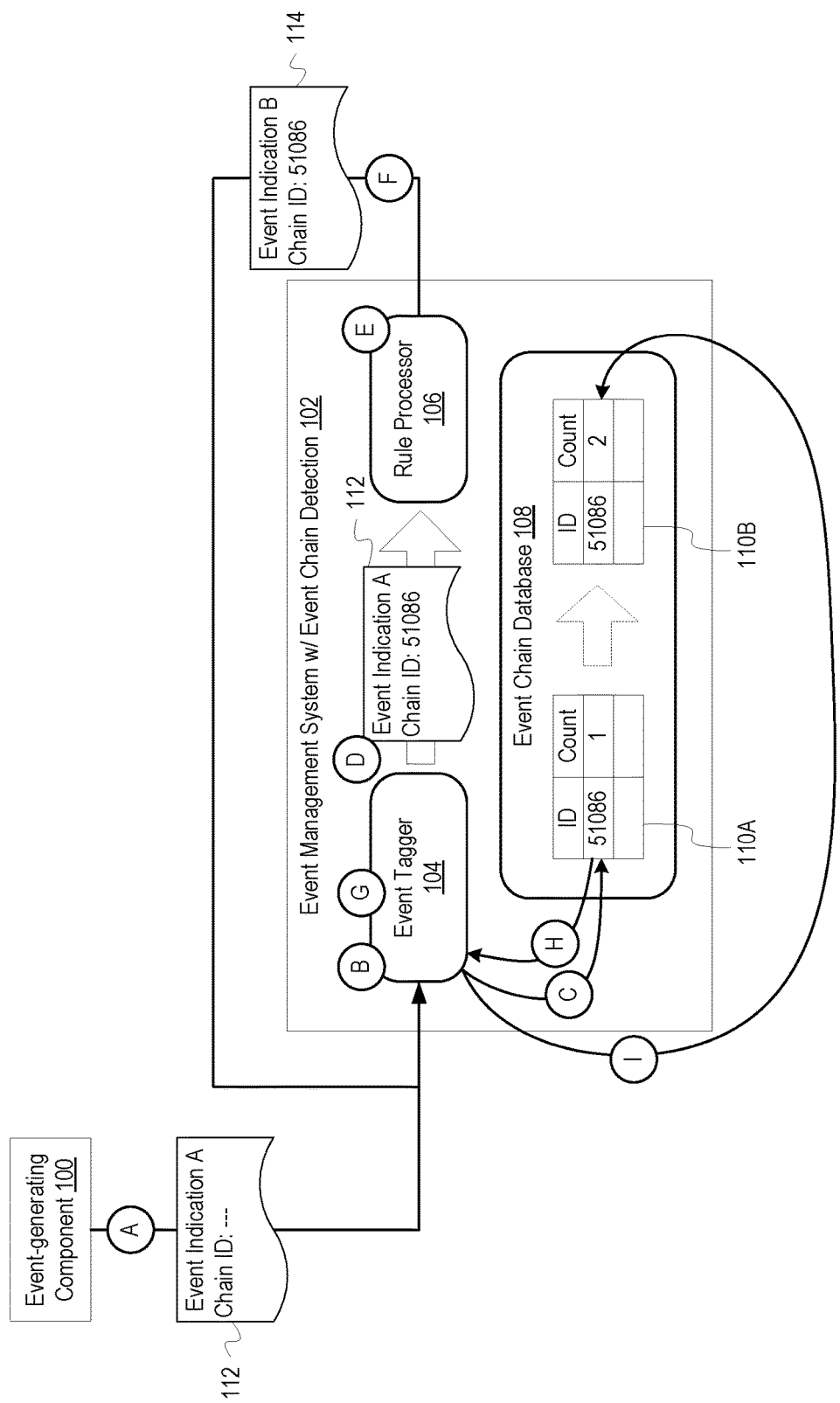
FIG. 1 depicts the operations of an event management system that detects event chains using an event chain database.

The description that follows includes example systems, methods, techniques, and program flows that embody aspects of the disclosure. However, it is understood that this disclosure may be practiced without these specific details. For instance, this disclosure refers to event chain detection in illustrative examples. But aspects of this disclosure can be applied to message chain detection and other aspects of computing systems that may cause chains. In other instances, well-known instruction instances, protocols, structures and techniques have not been shown in detail in order not to obfuscate the description.

Because event indications can be forwarded or generated in response to other event indications, event chains may be created. An event chain occurs when the event management system receives an event indication that was generated in response to the processing of a previous event indication. For example, a rule may specify that a new event indication should be generated and sent back to the event management system. As another example, a rule may specify that a new event indication should be generated and sent to another component; when the component receives the event indication, the component may generate a new event indication and send the new event indication to the event management system. To put it another way, an event chain is a series of event indications received by the event management system that result from receiving a previous event indication.

In some instances, the event chains can include a large number of event indications or may continue indefinitely, which may increase the load on the event management system, thus decreasing the ability of the event management system to process other event indications.

To identify event chains, the event management system determines whether a received event indication has been tagged, and if not, tags the event indication. The event management system then tracks the number of event indications in the event chain. To track the number of event indications in an event chain, the event management system increments a count associated with the event chain if the event indication has previously been tagged. If an event indication is generated or forwarded while processing a received event indication, the generated or forwarded event indication is tagged with the tag that identifies the received event indication as being part of an event chain.

The particular technique used to track the number of events in the event chain can vary. For example, if the received event indication was not previously tagged, the event management system can tag the event indication with a chain identifier. The event management system stores an entry that includes the chain identifier and a default event chain count in an event chain database. If the event management system subsequently receives an event indication that includes the chain identifier, the event management system increments the event chain count that corresponds to the chain identifier stored in the event chain database. As another example, the event chain count can be embedded in the event indication in place of a chain identifier. When the event management system receives an event indication that already has an event chain count, the event chain count is incremented. Any event indications that are generated while processing the received event indication include the incremented event chain count.

FIG. 1 depicts the operations of an event management system that detects event chains using an event chain database. FIG. 1 depicts an event-generating component (hereinafter "component") 100 and event management system with event chain detection (hereinafter "EMS") 102. EMS 102 includes an event tagger 104, a rule processor 106, and an event chain database 108. The event chain database 108 includes table 110, represented by states 110A and 110B. The component 100 and EMS 102 are communicatively coupled. For example, the component 100 and the EMS 102 may be communicatively coupled via a local area network, wide area network, public network, etc. As another example, the component 100 and the EMS 102 may be part of the same computing system and may communicate using inter-process messaging, function calls, etc.

At stage A, the component 100 generates event indication A 112 and sends event indication A 112 to the EMS 102. The component 100 generates event indication A 112 in response to detecting an event. Event indication A 112 can include metadata associated with the event, such as event type, event time, event severity, etc. Event indication A 112 may or may not include a field for a chain identifier. As depicted in FIG. 1, if event indication A 112 does have a field for a chain identifier, the field is empty (or otherwise identified as not including a chain identifier, e.g., set to 'null') when event indication A 112 is sent to the EMS 102. The component 100 sends event indication A 112 to the EMS 102 via the communication channel that communicatively couples the component 100 and the EMS 102.

At stage B, the event tagger 104 receives event indication A 112 from the component 100 and determines whether event indication A 112 has been assigned a chain identifier. Typically, the event tagger 104 receives event indication A 112 indirectly. For example, one or more components of the EMS 102 or a computing system on which the EMS 102 is executing may receive event indication A 112 and pass event indication A 112 to the event tagger 104.

To determine whether event indication A 112 has been assigned a chain identifier, the event tagger 104 can determine whether event indication A 112 has a chain identifier field and if so, whether the chain identifier field includes a chain identifier. In this particular example, the event tagger 104 determines that event indication A 112 has not been assigned a chain identifier.

At stage C, the event tagger 104 generates a chain identifier for event indication A and stores the chain identifier in an entry in the event chain database 108. The chain identifier can take various forms. For example, the chain identifier can be a monotonically increasing integer, a random value, etc. The event tagger 104 may generate the chain identifier itself or in conjunction with another component, such as the event chain database 108. For example, if the chain identifier is a monotonically increasing integer, the event tagger 104 may track the last generated chain identifier and increment it as needed. In some implementations, the event tagger 104 may write an entry to the event chain database 108 without a chain identifier. The event chain database 108 may automatically generate a chain identifier based on the previously generated chain identifiers and return the generated chain identifier to the event tagger 104. If the chain identifier is a random value, the event tagger 104 may generate the value and query the event chain database 108 to determine whether the value has already been used. In some implementations, the event chain database 108 can generate the random value and return it to the event tagger 104, as with monotonically increasing integers. In this example, the event tagger 104 generates chain identifier '51086'.

The event tagger 104 stores the chain identifier in an entry in the event chain database 108. In particular, the event tagger 104 writes an entry to the table 110 that includes the chain identifier and a count of events in the corresponding event chain (hereinafter "event count"). Since event indication A 112 is the first event indication of a new event chain (indicated by the lack of a chain identifier when received by the event tagger 104), the count of events in the corresponding event chain is '1'. While the examples herein use one-based numbering for the event count, some implementations may use zero-based numbering (e.g., the initial event count might be '0'). The table 110 after storing the entry corresponding to the generated chain identifier is represented by table state 110A. In particular, the table 110 includes an entry comprising the generated chain identifier ('51086') and the corresponding event count ('1').

At stage D, the event tagger 104 assigns the chain identifier generated at stage C to event indication A 112 and sends event indication A 112 to the rule processor 106. The event tagger 104 assigns the chain identifier to event indication A 112 by adding the chain identifier field to event indication A 112 (if not already present) and setting the chain identifier field to the chain identifier. In particular, FIG. 1 depicts event indication A 112 as being sent to the rule processor 106 with the chain identifier ("Chain ID") field set to '51086'.

The technique used to send event indication A 112 to the rule processor 106 can vary. The event tagger 104 may send event indication A 112 using inter-process messaging, by calling a function and passing event indication A 112 (or a reference thereto) as a parameter, etc. In some implementations, the EMS 102 may be distributed across multiple computing systems. In such implementations, the event tagger 104 can send event indication A 112 to the rule processor 106 via a network.

At stage E, the rule processor 106 identifies one or more rules corresponding to the event associated with event indication A 112 and processes event indication A 112. The rule processor 106 can identify the one or more rules based, at least in part, on metadata included with event indication A 112. For example, the rule processor 106 may query a rule database for rules associated with an event type specified in the metadata included with event indication A 112.

Once the one or more rules are identified, the rule processor 106 processes event indication A 112 in accordance with the rules. In this example, processing event indication A 112 results in the generation of event indication B 114. After, or during, the generation of event indication B 114, the rule processor 106 determines that event indication A 112 has a chain identifier and adds a chain identifier field to event indication B 114. The rule processor 106 also sets the chain identifier field in event indication B 114 to the same value as the chain identifier field in event indication A 112 (e.g., '51086').

At stage F, the rule processor 106 sends event indication B 114 to a destination component in accordance with one or more rules. Although FIG. 1 depicts EMS 102 as being the destination component, the destination component can vary. For the example depicted in FIG. 1, it is assumed that the event indication B 114 is sent to EMS 102, whether directly by the rule processor 106 or via one or more separate, intermediate components.

At stage G, the event tagger 104 receives event indication B 114 and determines whether event indication B 114 has been assigned a chain identifier. The event tagger 104 can perform operations similar to those described above at stage B to determine whether event indication B 114 has been assigned a chain identifier. In this example, the event tagger 104 determines that event indication B 114 has been assigned a chain identifier.

At stage H, the event tagger 104 reads the event count associated with chain identifier '51086' from the event chain database 108 and determines whether the event count exceeds a threshold. The threshold can be static or configurable. For example, in some implementations the threshold may be statically included as part of the event tagger 104 or may be included in a configuration file read from a storage device with the EMS 102 begins operations and/or periodically thereafter. The particular value used for the threshold can vary. For example, testing of the EMS 102 may indicate that most event chains end after a certain number of events (e.g., twenty events), while event chains that surpass twenty events tend to continue for many more events. Thus, the threshold may be set to '25', allowing most event chains to end normally while keeping longer event chains from continuing to use the resources of the EMS 102.

To read the event count from the event chain database 108, the event tagger 104 can include the chain identifier in a query sent to the event chain database 108. In response to receiving the query, the event chain database 108 looks up the entry with the chain identifier included in the query, reads the event count, and returns the event count to the event tagger 104. In this particular example, the event tagger 104 determines that the event count does not exceed the threshold.

At stage I, the event tagger 104 increments the event count. In this particular example, event indication B 114 is the second event indication received for the event chain identified by chain identifier '51086', and thus the corresponding count is incremented from '1' to '2', as indicated by table state 110B. The event tagger 104 can increment the event count by sending an update query to the event chain database 108 that includes the incremented event count. In some instances, the query may not include the incremented event count; instead, the query may include a command indicating that the event chain database 108 should increment the event count stored in the table 110.

The operations performed by the EMS 102 and related components at stages B through I are performed for each additional event indication received. In particular, new chain identifiers are generated and assigned to event indicators when an event indicator without a chain identifier is received and event counts associated with chain identifiers are incremented when event indications that include chain identifiers are received.

The example described in FIG. 1 depicts event indication B 114 being generated by the rule processor 106 while processing event indication A 112. In some instances, multiple event indications may be generated while processing a single event indication. For example, multiple rules associated with a particular event may result in event indications being generated or a single rule may result in multiple event indications being generated. Further, some rules may specify that the event indication being processed (e.g., event indication A 112) should be forwarded instead of generating a new event indication (e.g., event indication B 114).

Figure 2:
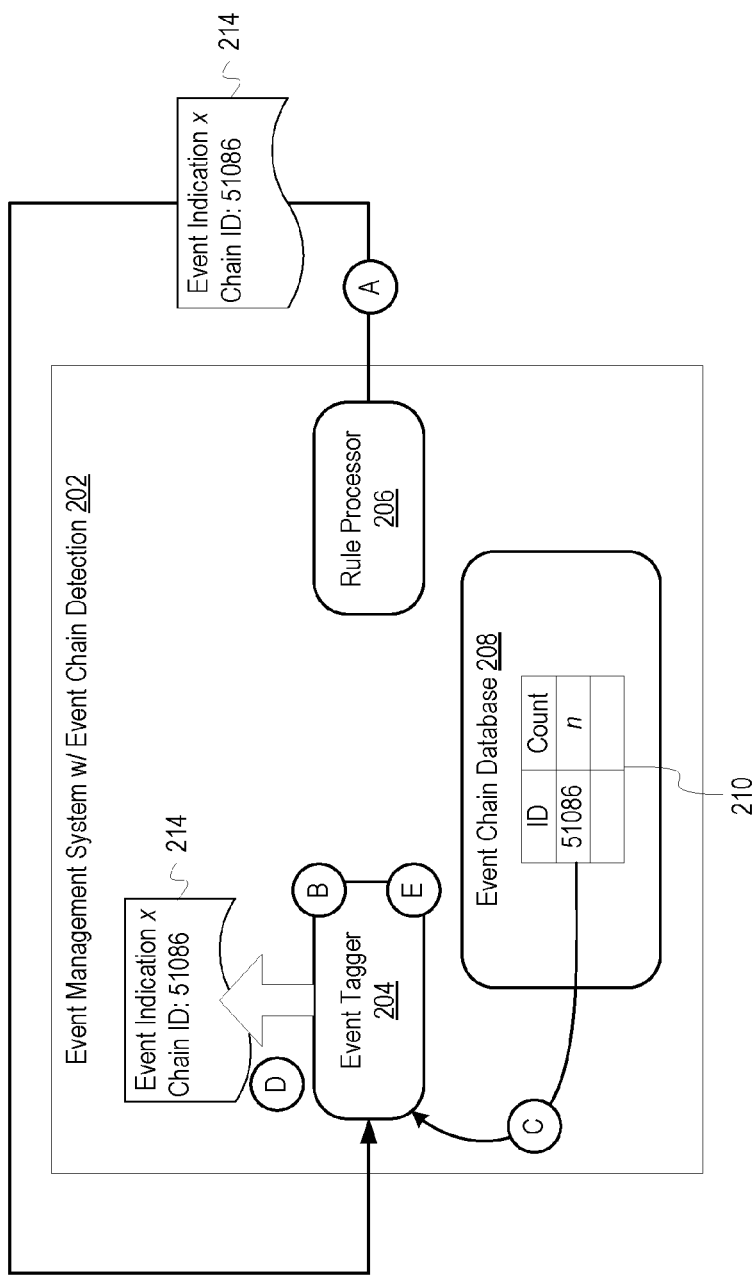
FIG. 2 depicts example operations of an event management system breaking an event chain using an event chain database.

FIG. 2 depicts example operations of an EMS breaking an event chain using an event chain database. FIG. 2 depicts an EMS 202, which includes an event tagger 204, a rule processor 206, and an event chain database 208. The operations depicted in FIG. 2 assume that the event tagger 204 has received n event indications assigned the chain identifier '51086'. Table 210 reflects the current event count ('n') associated with chain identifier '51086'.

At stage A, the rule processor 206 sends event indication x 214 to the EMS 202. The operations performed by the rule processor 206 at stage A can be substantially similar to those performed by the rule processor 106 of FIG. 1 at stage F. As indicated in FIG. 2, event indication x 214 contains a chain identifier field with the value '51086'.

At stage B, the event tagger 204 receives event indication x 214 and determines that event indication x 214 has been assigned a chain identifier ('51086'). The operations performed by the event tagger 204 to determine that event indication x 214 has been assigned a chain identifier can be substantially similar to those performed by the event tagger 104 of FIG. 1 at stage G.

At stage C, the event tagger 204 reads the event count associated with chain identifier '51086' from the event chain database 208 and determines that the event count exceeds a threshold. The threshold can be the same as the threshold described above. To read the event count from the event chain database 208, the event tagger 204 can include the chain identifier in a query sent to the event chain database 208. In response to receiving the query, the event chain database 208 looks up the entry with the chain identifier included in the query, reads the event count, and returns the event count to the event tagger 204. The event tagger 204 can determine that the event count exceeds the threshold by comparing the event count to the threshold.

At stage D, the event tagger 204 discards event indication x 214 in response to determining that the event count exceeds the threshold. The operations performed by the event tagger 204 to discard event indication x 214 can vary depending on how event indications are represented by the EMS 202. For example, the event tagger 204 may delete or overwrite data representing event indication x 214 or remove a reference to event indication x 214 and deallocate memory used for event indication x 214. Regardless of the technique used to discard event indication x 214, the event tagger 204 prevents the event indication x 214 from being processed by the rule processor 206, thus preventing any additional event indications associated with the event chain from being created.

At stage E, the event tagger 204 indicates that an event chain has been broken. The particular operations performed to indicate that an event chain has been broken can vary. For example, the event tagger 204 might write a message to a log or send a notification to an administrator.

Figure 3:
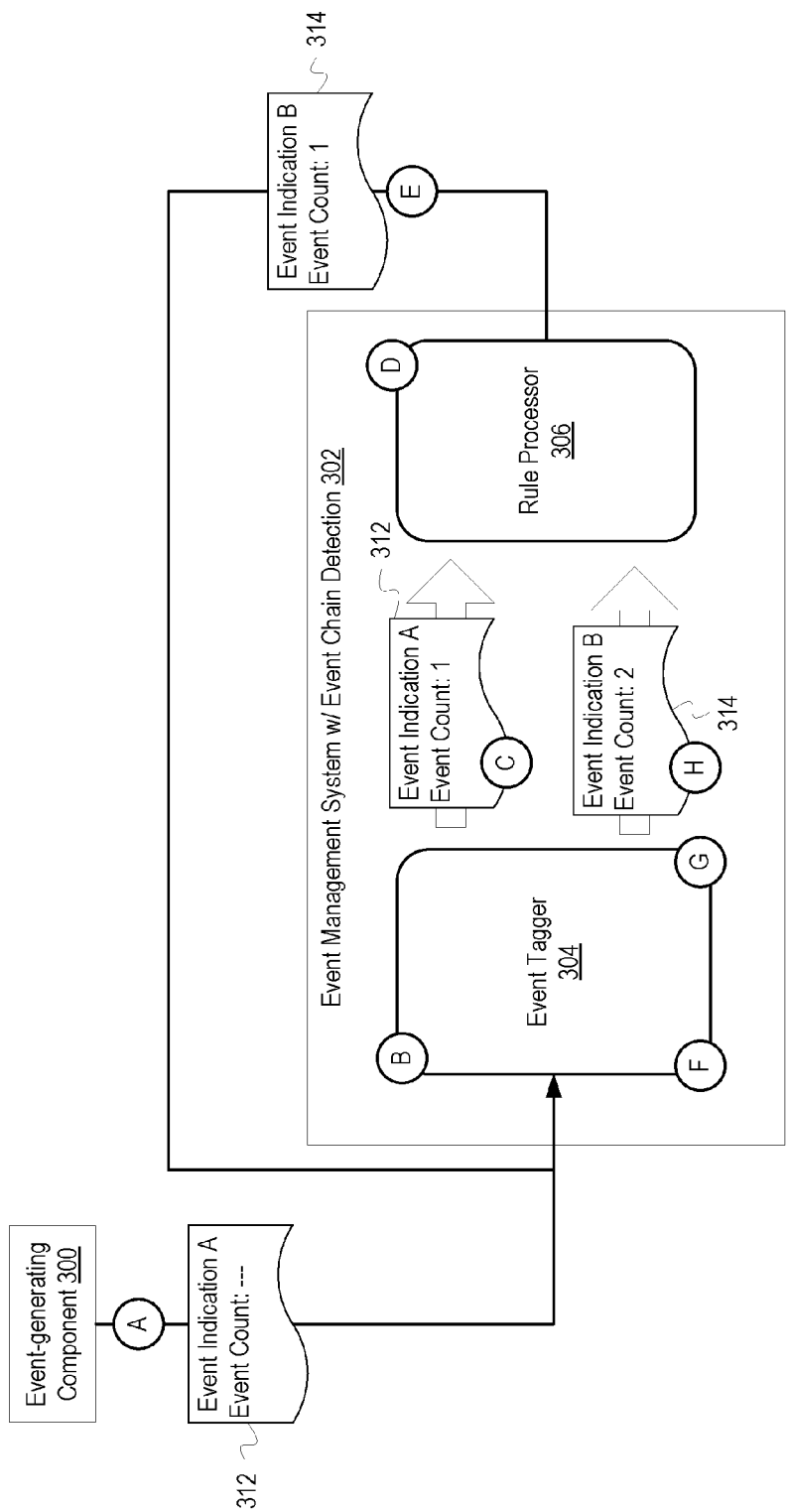
FIG. 3 depicts the operations of an event management system that detects event chains using an embedded event count.

FIG. 3 depicts the operations of an EMS that detects event chains using an embedded event count. FIG. 3 depicts a component 300 and an EMS 302. The EMS 302 includes an event tagger 304 and a rule processor 306. The component 300 and EMS 302 are communicatively coupled. For example, the component 300 and the EMS 302 may be communicatively coupled via a local area network, wide area network, public network, etc. As another example, the component 300 and the EMS 302 may be part of the same computing system and may communicate using inter-process messaging, function calls, etc.

At stage A, the component 300 generates event indication A 312 and sends event indication A 312 to the EMS 302. The component 300 generates event indication A 312 in response to detecting an event. Event indication A 312 can include metadata associated with the event, such as event type, event time, event severity, etc. Event indication A 312 may or may not include a field for an event count. As indicated in FIG. 3, if event indication A 312 does have an event count field, the event count field is empty (or otherwise identified as not including an event count, e.g., set to 'null') when event indication 312 is sent to the EMS 302. The component 300 sends event indication A 312 to the EMS 302 via the communication channel that communicatively couples the component 300 and the EMS 302.

At stage B, the event tagger 304 receives event indication A 312 from the component 300 and determines whether event indication A 312 includes an event count. Typically, the event tagger 304 receives event indication A 312 indirectly. For example, one or more components of the EMS 302 or a computing system on which the EMS 102 is executing may receive event indication A 312 and pass event indication A 312 to the event tagger 304.

To determine whether event indication A 312 has an event count, the event tagger 304 can determine whether event indication A 312 has an event count field and if so, whether the event count field includes a count or is empty. In this particular example, the event tagger 304 determines that event indication A 312 does not have an event count.

At stage C, the event tagger 304 initializes the event count field of event indication A 312 and sends event indication A 312 to the rule processor 306. To initialize the event count field, the event tagger 304 adds the event count field to event indication A 312 (if not already present) and sets the event count field value to '1'. As noted above, some implementations may use zero-based counting, and may thus initialize the event count field value to '0'.

The technique used to send event indication A 312 to the rule processor 306 can vary. The event tagger 304 may send event indication A 312 using inter-process messaging, by calling a function and passing event indication A 312 (or a reference thereto) as a parameter, etc. In some implementations, the EMS 302 may be distributed across multiple computing systems. In such implementations, the event tagger 304 can send event indication A 312 to the rule processor 306 via a network.

At stage D, the rule processor 306 identifies one or more rules corresponding to the event that resulted in the generation of event indication A 312 and processes event indication A 312. The rule processor 306 can identify the one or more rules based, at least in part, on metadata included with event indication A 312. For example, the rule processor 306 may query a rule database for rules associated with an event type specified in the metadata included with event indication A 312.

Once the one or more rules are identified, the rule processor 306 processes event indication A 312 in accordance with the rules. In this example, processing event indication A 312 results in the generation of event indication B 314. After, or during, the generation of event indication B 314, the rule processor 306 determines that event indication A 312 has an event count field and adds an event count field to event indication B 314. The rule processor 306 also sets the event count field in event indication B 314 to the same value as the event count field in event indication A 312.

At stage E, the rule processor 306 sends event indication B 314 to a destination component in accordance with one or more rules. Although FIG. 3 depicts EMS 302 as being the destination component, the destination component can vary. For the example depicted in FIG. 3, it is assumed that the event indication B 314 is sent to EMS 302, whether directly by the rule processor 306 or via one or more separate, intermediate components.

At stage F, the event tagger 304 receives event indication B 314 and determines whether event indication B 314 includes an event count. The event tagger 304 can perform operations similar to those described above at stage B to determine whether event indication B 314 includes an event count. In this example, event tagger 304 determines that event indication B 314 does include an event count.

At stage G, the event tagger 304 determines whether the event count included with event indication B 314 exceeds a threshold. The threshold can be similar to the threshold described above in relation to FIGS. 1 and 2. To determine whether the event count included with event indication B 314 exceeds the threshold, the event tagger 304 reads the event count from event indication B 314 and compares the event count to the threshold. In this particular example, the event tagger 304 determines that the event count does not exceed the threshold.

At stage H, the event tagger 304 increments the event count included in event indication B 314 and sends event indication B 314 to the rule processor 306. Because event indication B 314 was received with an event count of '1', the event tagger 304 increments the event count to '2'. The operations performed to send event indication B 314 to the rule processor 306 can be substantially similar to those performed at stage C.

The operations performed by the EMS 302 and related components at stages B through H are performed for each additional event indication received. In particular, new event counts are initialized for event indicators received when the event indicators do not include an event count field or if the event count field is empty. The event count fields are incremented when event indications that include non-empty event count fields are received.

The example described in FIG. 3 depicts event indication B 314 being generated by the rule processor 306 while processing event indication A 312. In some instances, multiple event indications may be generated while processing a single event indication. For example, multiple rules associated with a particular event may result in event indications being generated or a single rule may result in multiple event indications being generated. Further, some rules may specify that the event indication being processed (e.g., event indication A 312) should be forwarded instead of generating a new event indication (e.g., event indication B 314).

Figure 4:
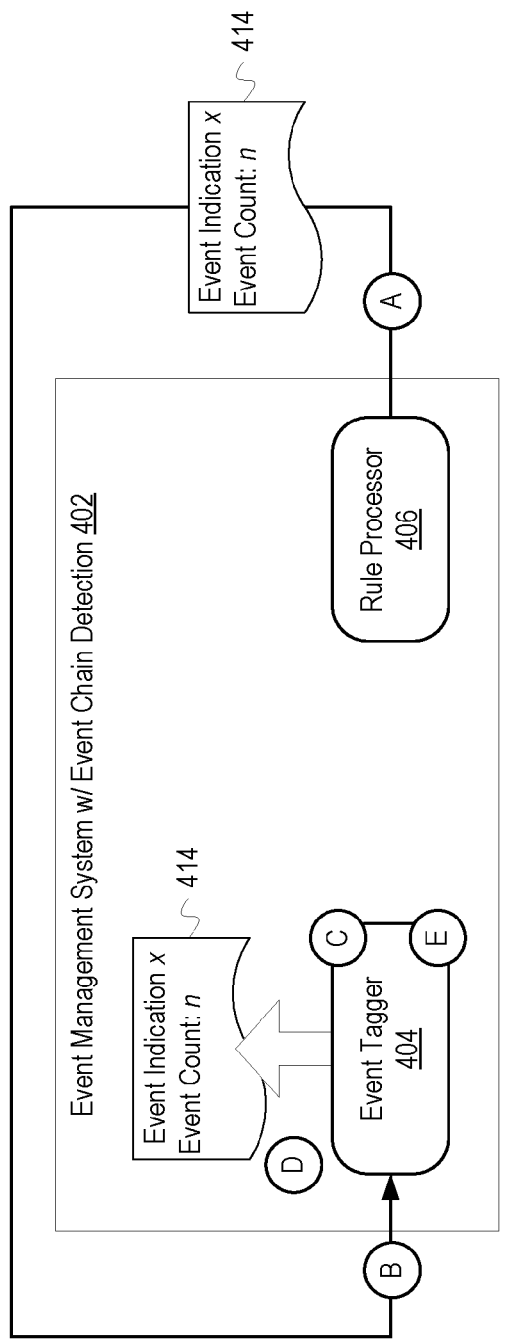
FIG. 4 depicts example operations of an event management system breaking an event chain using an embedded event count.

FIG. 4 depicts example operations of an EMS breaking an event chain using an embedded event count. FIG. 4 depicts an EMS 402, which includes an event tagger 404 and a rule processor 406. The operations depicted in FIG. 4 assume that the event tagger 404 has received n event indications in the same event chain. Event indication x 414 reflects this assumption by depicting the event count field value as being 'n'.

At stage A, the rule processor 406 sends event indication x 414 to the EMS 402. The operations performed by the rule processor 406 at stage A can be substantially similar to those performed by the rule processor 306 of FIG. 3 at stage E. As indicated in FIG. 4, event indication x 414 contains an event count field with the value n.

At stage B, the event tagger 404 receives event indication x 414 and determines that event indication x 414 includes a non-empty event count field. The operations performed by the event tagger 404 to determine that event indication x 414 has an event count field can be substantially similar to those performed by the event tagger 304 of FIG. 3 at stage F.

At stage C, the event tagger 404 reads the event count from event indication x and determines that the event count exceeds a threshold. The threshold can be the same as, or substantially similar to the thresholds described above. The event tagger 404 can determine that the event count exceeds the threshold by comparing the event count to the threshold.

At stage D, the event tagger 404 discards event indication x 414 in response to determining that the event count exceeds the threshold. The operations performed by the event tagger 404 to discard event indication x 414 can vary depending on how event indications are represented by the EMS 402. For example, the event tagger 404 may delete or overwrite data representing event indication x 414 or remove a reference to event indication x 414 and deallocate memory used for event indication x 414. Regardless of the technique used to discard event indication x 414, the event tagger 404 prevents the event indication x 414 from being processed by the rule processor 406, thus preventing any additional event indications associated with the event chain from being created.

At stage E, the event tagger 404 indicates that an event chain has been broken. The particular operations performed to indicate that an event chain has been broken can vary. For example, the event tagger 404 might write a message to a log or send a notification to an administrator.

Figure 5:
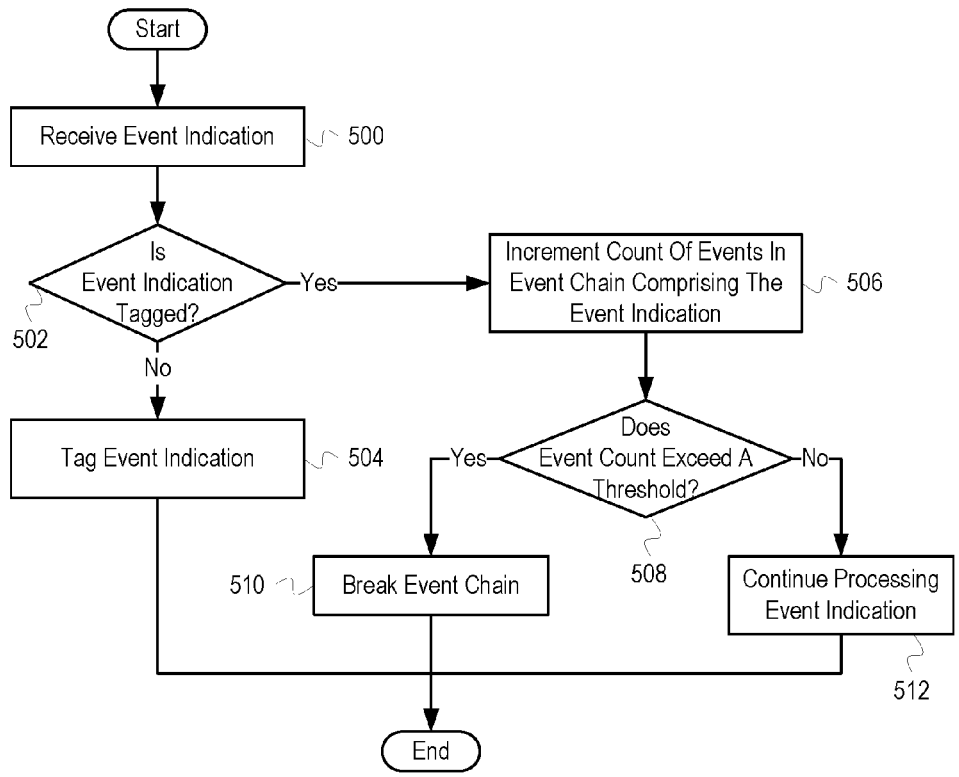
FIG. 5 depicts a flowchart of example operations for detecting and breaking an event chain.

FIG. 5 depicts a flowchart of example operations for detecting and breaking an event chain. The operations depicted in FIG. 5 can be performed by an EMS, such as EMS 102, EMS 202, EMS 302, or EMS 402 of FIGS. 1, 2, 3, and 4, respectively, or any suitable component.

Initially, an EMS receives an event indication (500). The event indication corresponds to an event. The event indication can include metadata, such as an event type, event severity, etc.

After receiving the event indication, the EMS determines whether the event indication has been tagged (502). The particular operations performed to determine whether the event indication has been tagged can vary depending on the mechanism used to tag the event indication. For example, if event indications are tagged using chain identifiers, the EMS can determine whether the event identifier metadata includes a chain identifier. If the event indications are tagged using embedded event counts, the EMS can determine whether the event identifier metadata includes an embedded event count. If the EMS determines that the event indication has not been tagged, control flows to block 502. If the EMS determines that the event indication has been tagged, control flows to block 506.

If the EMS determined that the event indication has not been tagged (502), the EMS tags the event indication (504). As described above, various techniques can be used to tag the event indication, and the operations to do so can vary similarly. For example, if event indications are tagged using a chain identifier, the EMS may generate a chain identifier and store the chain identifier in the event indication metadata. If event indications are tagged using an embedded event count, the EMS can store a default event count (e.g., '1') in the event indication metadata. After the EMS tags the event indication, the process ends.

If the EMS determined that the event indication has been tagged (502), the EMS increments an event count corresponding to the event chain comprising the event indication (506). The event count can be stored in an event chain database or in the event indication metadata.

After incrementing the event count, the EMS determines whether the event count exceeds a threshold (508). The threshold may be static or dynamic and can be stored as part of the EMS, in a configuration file accessible to the EMS, in a database, etc. The EMS determines whether the event count exceeds the threshold by comparing the event count to the threshold. If the EMS determines that the event count exceeds the threshold, control flows to block 510. If the EMS determines that the event count does not exceed the threshold, control flows to block 512.

If the EMS determined that the event count exceeds the threshold (508), the EMS breaks the event chain (510). The particular operations performed to break the event chain can vary. For example, the event indication can be "discarded" or otherwise prevented from being processed any further. As another example, processing of the event indication may be allowed but event indications generated during the processing of the event indication may not be sent to other components. While the operations performed to break the event chain can vary, the operations generally prevent additional event indications associated with the event chain from being generated or sent in a manner that may result in the EMS receiving another event indication associated with the event chain. After the EMS breaks the event chain, the process ends.

If the EMS determined that the event count does not exceed the threshold (508), the EMS continues processing the event indication. Continued processing of the event indication can include identifying rules associated with the event indication, processing the event indication in accordance with the rules, etc. After the EMS continues processing the event indication, the process ends.

Figure 6:
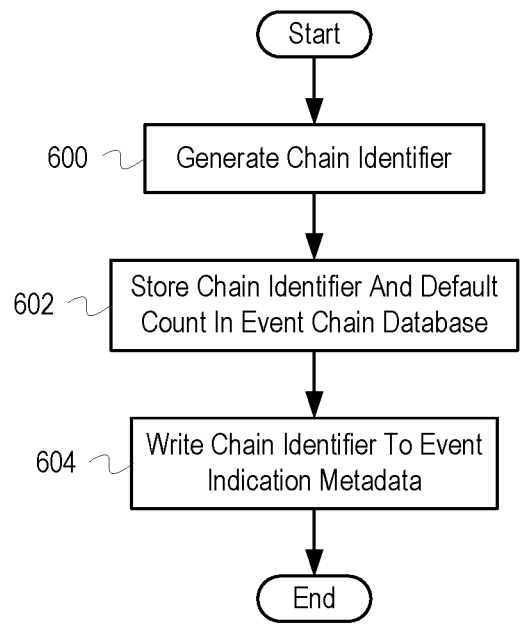
FIG. 6 depicts a flowchart of operations for tagging an event indication using a chain identifier.

FIG. 6 depicts a flowchart of operations for tagging an event indication using a chain identifier. The operations depicted in FIG. 6 can be performed by an EMS, such as EMS 102, EMS 202, EMS 302, or EMS 402 of FIGS. 1, 2, 3, and 4, respectively, or any suitable component. The operations depicted in FIG. 6 can be used to tag an event indication as described in FIG. 5 at block 504.

When an EMS determines that an event indication should be tagged, the EMS generates a chain identifier (600). The operations performed to generate a chain identifier can vary depending on the implementation of the chain identifier. For example, if the chain identifier is a monotonically increasing integer, the EMS may determine the next chain identifier by reading a variable that contains the current chain identifier. The variable containing the current chain identifier is then incremented. If the chain identifier is a random value, the EMS may generate a random value using a hash function, random number generator, or using another technique. Once the random value is generated, the EMS queries an event chain database or checks a data structure containing a history of used chain identifiers to determine if the random value has been used as a chain identifier previously. If the random value has been used as a chain identifier previously, the EMS generates a new random value, repeating this process until an unused random value is generated.

In some implementations, multiple components may be used to generate a chain identifier. For example, an EMS component, such as an event tagger, may work in conjunction with the event chain database to generate the chain identifier. For example, the event tagger may request that the event chain database generate a chain identifier. As another example, the chain identifier may be generated automatically by the event chain database when a new entry is created (e.g., when an insert command is sent to the event chain database at block 602).

The EMS stores the chain identifier and a default event count in the event chain database (602). To store the chain identifier and the default event count to the event chain database, the EMS can send an insert command (e.g., an insert query) to the event chain database including the chain identifier and the default event count.

After storing the chain identifier and the default event count in the event chain database, the EMS writes the chain identifier to metadata associated with the event indication (604). The particular operations performed to write the chain identifier to the metadata can vary depending on the location of the metadata, the format of the metadata, etc. After writing the chain identifier to the metadata associated with the event indication, the process ends.

In some implementations, as described above, the event chain database may be configured to generate the chain identifier automatically in response to an insert command. In such implementations, the EMS sends an insert command to the event chain database that includes the default event count but no chain identifier. In response to the command (or a subsequent query), the event chain database returns the generated chain identifier to the EMS. Thus, in some implementations, the operations of blocks 600 and 602 may be merged.

The operations performed to tag an event using an embedded event count generally include writing the default event count to the event indication metadata, similar to the operations described at block 604 of FIG. 6.

Figure 7:
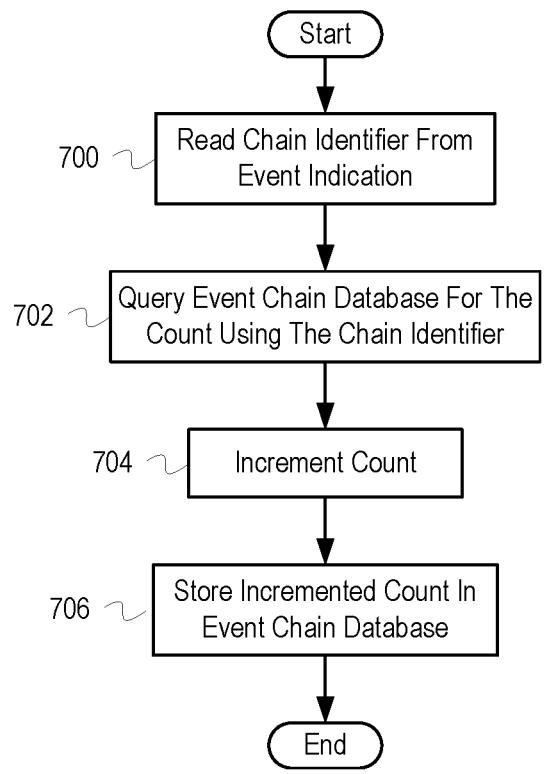
FIG. 7 depicts a flowchart of example operations for incrementing the event count when using a chain identifier.

FIG. 7 depicts a flowchart of example operations for incrementing the event count when using a chain identifier. The operations depicted in FIG. 7 can be performed by an EMS, such as EMS 102, EMS 202, EMS 302, or EMS 402 of FIGS. 1, 2, 3, and 4, respectively, or any suitable component. The operations depicted in FIG. 7 can be used to increment the count of events in the event chain as described in FIG. 5 at block 506.

When an EMS determines that an event indication has already been tagged, the EMS reads the chain identifier from the event indication (700). The chain identifier, as described above, is typically stored in event indication metadata. The particular operations performed to read the chain identifier from the event indication metadata can vary depending on the location of the event indication metadata, the format of the event indication metadata, etc.

After reading the chain identifier from the event indication, the EMS queries an event chain database for the corresponding event count (702). In particular, the EMS sends a query to the event chain database that requests the event count and includes the chain identifier. In response, the event chain database sends the event count to the EMS.

After querying the event chain database for the event count, the EMS increments the event count (704). After incrementing the event count, the EMS stores the incremented event count in the event chain database (706). To store the incremented event count in the event chain database, the EMS sends a query to the event chain database (e.g., an update query) that includes the chain identifier and the incremented event count. After storing the incremented event count in the event chain database, the process ends.

Figure 8:
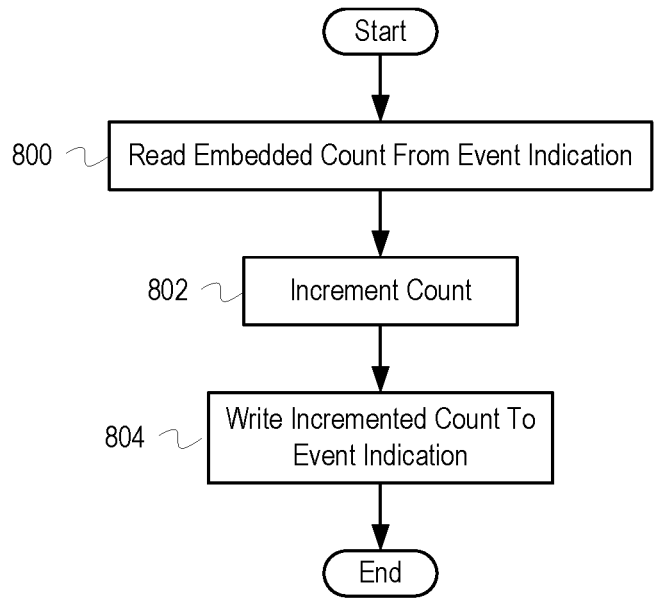
FIG. 8 depicts a flowchart of example operations for incrementing the event count when using an embedded event count.

FIG. 8 depicts a flowchart of example operations for incrementing the event count when using an embedded event count. The operations depicted in FIG. 8 can be performed by an EMS, such as EMS 102, EMS 202, EMS 302, or EMS 402 of FIGS. 1, 2, 3, and 4, respectively, or any suitable component. The operations depicted in FIG. 8 can be used to increment the count of events in the event chain as described in FIG. 5 at block 506.

When an EMS determines that an event indication has already been tagged, the EMS reads the embedded event count from the event indication (800). The embedded event count, as described above, is typically stored in event indication metadata. The particular operations performed to read the embedded event count from the event indication metadata can vary depending on the location of the event indication metadata, the format of the event indication metadata, etc.

After reading the embedded event count from the event indication, the EMS increments the event count (802). After incrementing the event count, the EMS writes the incremented event count to the event indication (804). As described above, the embedded event count is typically stored in event indication metadata. The particular operations performed to write the event count to the event indication metadata can vary depending on the location of the event indication metadata, the format of the event indication metadata, etc.

Variations

The examples above describe an event tagger assigning a chain identifier to an event indication prior to sending the event indication to a rule processor, and then the rule processor assigning the chain identifier to any event indication generated. In some implementations, however, the event tagger, or the operations thereof, can be incorporated into the rule processor. By combining the two, rules can be used to dictate whether event chain detection is used for a particular event/event indication. For example, a rule corresponding to a first event type may not specify that event chain detection is to be used for event indications corresponding to the first event type, thus resulting in no chain identifier being assigned to event indications corresponding to the first event type. A rule corresponding to a second event type, on the other hand, may specify that event chain detection is to be used for event indications corresponding to the second event type, thus resulting in a chain identifier being assigned to event indications corresponding to the second event type. The operations for performing event chain detection using an embedded event count can be similarly modified to be performed during the rule processing.

However, in some implementations in which an event tagger assigns chain identifiers to event indications prior to sending the event indication to the rule processor, rules may still be used to dictate whether chain identifiers are propagated to generated event indications or with forwarded event indications. For example, a rule may specify that chain identifiers are not to be copied from an event indication being processed to an event indication generated in accordance with the particular rule.

If event tagging is performed as part of the rule processing, the rule processing operations can be modified such that rule processing is halted if the event count exceeds the threshold. In some implementations, rule processing continues but no event indications are sent from the rule processor. In some implementations, the discarding of an event indication can be performed by generating a specific event indication that triggers a rule that breaks the event chain.

The examples above describe the event count as being incremented by one each time an event indication is received. In some implementations, the event count may be incremented by a value other than one. The value can vary between events as well. For example, if an event indication associated with a first event type is received, the event count may be incremented by one, but if an event indication associated with a second event type is received, the event count may be incremented by two. Such an implementation might be used if specific events are deemed more relevant than others. For example, more severe events (e.g., "critical" events) may be considered highly relevant while informational events (e.g., "notice" events) may be considered less relevant. Thus, the event count may be incremented by one when an indication of a severe event is received and incremented by two when an indication of an informational event is received. Such an implementation would result in a chain consisting of information event indications exceeding the event count threshold before a chain consisting of severe event indications. Generally, any information about a particular event (e.g., metadata in the event indication) can be used to influence the amount that the event count is incremented. For example, an event indication generated at a non-critical component (e.g., a client) may result in the event count being incremented more than an event indication generated at a more critical component (e.g., a primary database server). As another example, the event count may be incremented by a value that increases based on the event count itself. For example, if the event count is less than ten, the event count may be incremented by one; if the event count is greater than or equal to ten, the event count may be incremented by two; and if the event count is greater than or equal to twenty, the event count may be incremented by four.

Additionally, while the examples above describe event indications as being generated during rule processing, some rules may not generate new event indications, instead forwarding received event indications. The operation described herein can be adapted accordingly. In particular, the operations described herein can be adapted to detect event chains that include forwarded event indications.

For implementations that include a chain identifier database, chain identifiers can be periodically removed from the event chain database. For example, additional data may be stored in an entry corresponding to a particular chain identifier, such as the time that the event occurred, the time that the event indication was received, the time that the chain identifier was generated, the time that the most recent event indication with the chain identifier was received, event type, etc. The data can be used to select and remove chain identifiers that may not be in use anymore, thus decreasing the size of the event chain database. For example, if no event indication tagged with a particular chain identifier has been received in the past twenty-four hours, the chain identifier may be removed from the event chain database. If a chain identifier has been removed and an event identifier tagged with the chain identifier is received, the chain identifier can be inserted back into the event chain database or the event indication may be tagged with a new chain identifier. In some instances, instead of removing chain identifiers, old chain identifiers may be reused. In some implementations, chain identifiers from an event chain database may not be removed. For example, it may be determined that event chains do not occur frequently enough that the event chain database size would increase enough to warrant removing chain identifiers.

FIGS. 1 through 4 are annotated with a series of letters (e.g., A through I of FIG. 1). These letters represent stages of operations. Although these stages are ordered for these examples, the stages illustrate one example to aid in understanding this disclosure and should not be used to limit the claims. Subject matter falling within the scope of the claims can vary with respect to some of the operations and their order.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation depicted in block 506 of FIG. 5 can be performed after the operation depicted in block 508 of FIG. 5. As another example, the operations depicted in FIG. 5 can be performed in parallel or concurrently for different event indications. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
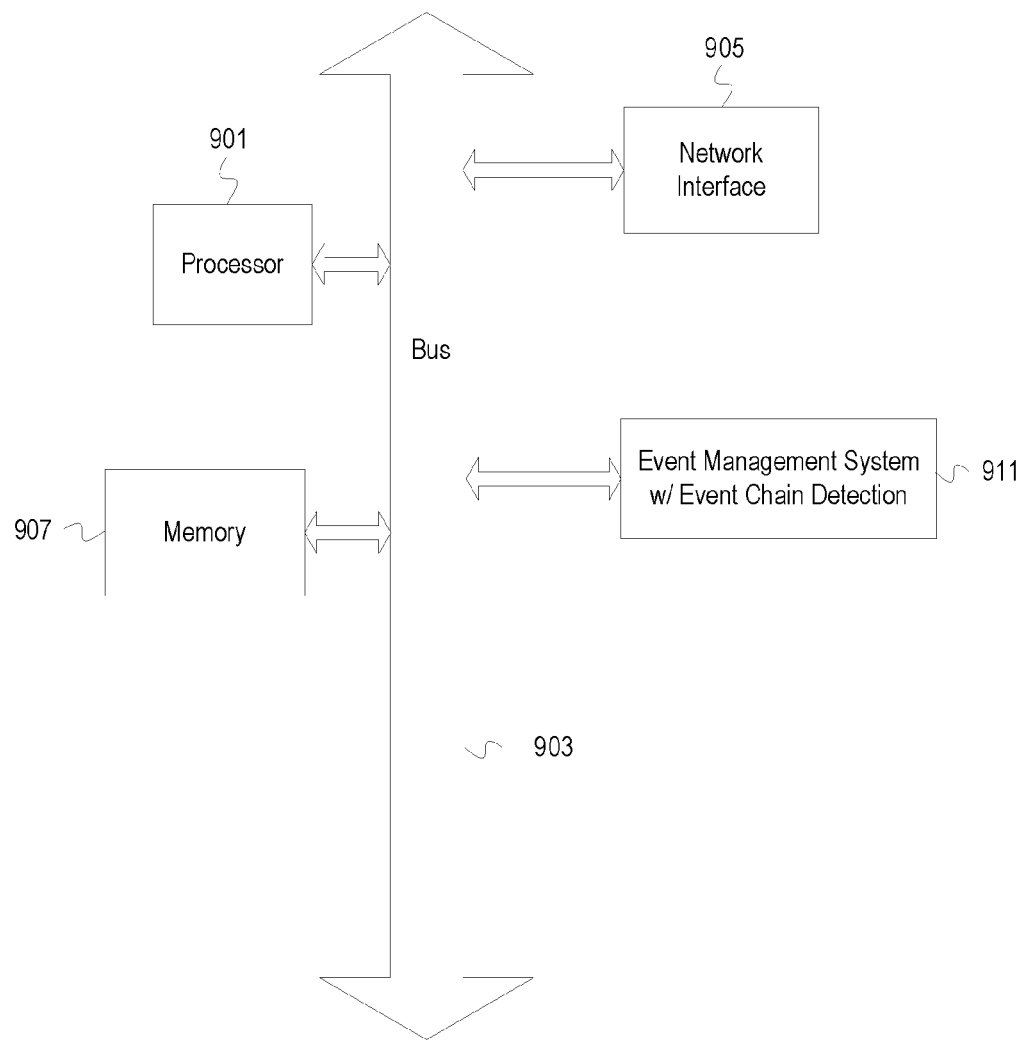
FIG. 9 depicts an example computer system with an event management system.

FIG. 9 depicts an example computer system with an EMS. The computer system includes a processor 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The system also includes an EMS 911. The EMS 911 embodies functionality described above. In particular, the EMS 911 receives event indications and determines whether the event indications have been tagged. If the event indications have not been tagged, the EMS 911 tags the event indications. If the event indications have been tagged, the EMS 911 increments an event chain count and/or determines whether the event chain count exceeds a threshold. If the event chain count exceeds the threshold, the EMS 911 breaks the event chain. Any one of the previously described functionalities may be partially (or entirely) implemented in hardware and/or on the processor unit 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for event chain detection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   receiving a first event indication;
   determining that the first event indication has not been associated with an existing tag;
   in response to determining that the first event indication has not been associated with an existing tag,
      generating a tag, wherein the generated tag is associated with an event chain; and
      associating the first event indication with the generated tag, wherein associating the first event indication with the generated tag indicates that the first event indication comprises the event chain;
   determining that an event count associated with the event chain does not exceed a threshold; and
   in response to determining that the event count does not exceed the threshold, processing the first event indication.

2. The method of claim 1, wherein generating the tag comprises generating a chain identifier, wherein associating the first event indication with the generated tag comprises:
   storing an entry comprising the chain identifier and a count in a table; and
   storing the chain identifier in metadata associated with the first event indication.

3. The method of claim 2, wherein generating the chain identifier comprises generating one of a monotonically increasing integer or a random value.

4. The method of claim 1, wherein associating the first event indication with the generated tag comprises storing a count in metadata associated with the first event indication.

5. The method of claim 1 further comprising:
   receiving a second event indication;
   determining that the second event indication has been associated with the generated tag;
   in response to determining that the second event indication has been associated with the generated tag, determining that the event count exceeds the threshold; and
   in response to determining that the event count exceeds the threshold, preventing an event management system from sending any additional event indications associated with the event chain.

6. The method of claim 5, wherein preventing the event management system from sending any additional event indications associated with the event chain comprises at least one of:
   discarding the second event indication;
   processing the second event indication without generating a third event indication; or
   processing the second event indication and generating the third event indication without sending the third event indication.

7. The method of claim 1, wherein processing the first event indication comprises:
   generating a second event indication based, at least in part, on the first event indication;
   associating the second event indication with the generated tag; and
   sending the second event indication to a component.

8. The method of claim 7, wherein associating the second event indication with the generated tag comprises:
   determining that the first event indication is associated with a chain identifier; and in response to determining that the first event indication is associated with the chain identifier, storing the chain identifier in metadata associated with the second event indication.

9. The method of claim 7, wherein associating the second event indication with the generated tag comprises:
   determining that metadata associated with the first event indication comprises the event count; and
   in response to determining that the metadata associated with the first event indication comprises the event count,
      incrementing the event count; and
      storing the incremented event count in the metadata associated with the second event indication.

10. One or more non-transitory machine readable storage media having program code for detecting event chains stored therein, the program code comprising instructions to:
   detect an event indication;
   determine whether the event indication comprises an existing event chain;
   in response to a determination that the event indication does not comprise an existing event chain, tag the event indication, wherein the tag of the event indication indicates that the event indication comprises an event chain;
   in response to a determination that the event indication comprises an existing event chain, determine whether an event count exceeds a threshold, wherein the event count is a count of event indications that comprise the event chain;
   in response to a determination that the event count does not exceed the threshold, increment the event count; and
   in response to a determination that the event count exceeds the threshold, break the event chain.

11. The one or more non-transitory machine readable storage media of claim 10, wherein the instructions to determine whether the event indication comprises an existing event chain comprise instructions to determine whether the event indication has been assigned an event chain identifier.

12. The one or more non-transitory machine readable storage media of claim 11, wherein the program code further comprises program code to:
   generate the event chain identifier; and
   store an entry comprising the event chain identifier and a count;
   wherein the instructions to tag the event indication comprise instructions to assign the generated event chain identifier to the event indication.

13. The one or more non-transitory machine readable storage media of claim 10, wherein the instructions to determine whether the event indication comprises an existing event chain comprise instructions to determine whether the event indication comprises the event count.

14. An apparatus comprising:
   a processor; and
   a machine readable medium having program code embodied therewith, the program code executable by the processor to cause the apparatus to,
      detect a first event indication;
      determine that the first event indication has not been tagged;
      in response a determination that the first event indication has not been tagged, tag the first event indication as comprising an event chain;
      determine that an event count associated with the event chain does not exceed a threshold; and
      in response to a determination that the event count does not exceed the threshold, process the first event indication.

15. The apparatus of claim 14, wherein the program code executable by the processor to cause the apparatus to tag the first event indication comprises program code executable by the processor to cause the apparatus to:
   generate a chain identifier; and
   assign the chain identifier to the first event indication.

16. The apparatus of claim 14, wherein the program code executable by the processor to cause the apparatus to tag the first event indication comprises program code executable by the processor to cause the apparatus to embed a count in the first event indication.

17. The apparatus of claim 14, wherein the program code is further executable by the processor to cause the apparatus to:
   detect a second event indication;
   determine that the second event indication has been tagged;
   in response to a determination that the second event indication has been tagged, determine that the event count exceeds the threshold; and
   in response to a determination that the event count exceeds the threshold, prevent an event management system from sending any additional event indications associated with the event chain.

18. The apparatus of claim 17, wherein the program code executable by the processor to cause the apparatus to prevent the event management system from sending any additional event indications associated with the event chain comprises program code executable by the processor to cause the apparatus to at least one of:
   discard the first event indication;
   process the first event indication without generation of the second event indication; or
   process the first event indication and generate the second event indication without a send of the second event indication.

19. The apparatus of claim 14, wherein the program code is further executable by the processor to cause the apparatus to:
   detect a second event indication; and
   increment the event count.

20. The apparatus of claim 19, wherein the program code executable by the processor to cause the apparatus to increment the event count comprises program code executable by the processor to cause the apparatus to:
   read a chain identifier from metadata associated with the second event indication;
   read an entry identified by the chain identifier from a table, wherein the entry comprises the event count;
   increment the event count; and
   update the entry to include the incremented event count.

* * * * *